United States Patent [19]
Guy

[11] Patent Number: 6,035,317
[45] Date of Patent: Mar. 7, 2000

[54] MODULAR ARITHMETIC COPROCESSOR COMPRISING TWO MULTIPLICATION CIRCUITS WORKING IN PARALLEL

[75] Inventor: Monier Guy, Rognac, France

[73] Assignee: SGS-Thomson Microelectronics S.A., Saint Genis, France

[21] Appl. No.: 09/004,375

[22] Filed: Jan. 8, 1998

[30] Foreign Application Priority Data

Jan. 9, 1997 [FR] France .................................. 97 00264

[51] Int. Cl.[7] ................................ G06F 7/52; G06F 7/00
[52] U.S. Cl. ............................................ 708/620; 708/492
[58] Field of Search .................................. 708/492, 491, 708/523, 524, 603, 620, 625

[56] References Cited

U.S. PATENT DOCUMENTS

| | | | |
|---|---|---|---|
| 4,771,379 | 9/1988 | Ando et al. ............................... | 364/200 |
| 4,949,292 | 8/1990 | Hoshino et al. .......................... | 708/524 |
| 5,513,133 | 4/1996 | Cressel et al. ........................... | 708/491 |

FOREIGN PATENT DOCUMENTS

| | | | |
|---|---|---|---|
| 0 395 240 | 10/1990 | European Pat. Off. .......... | G06F 7/52 |
| 0 601 907 | 6/1994 | European Pat. Off. .......... | G06F 7/72 |

*Primary Examiner*—Tan V. Mai
*Attorney, Agent, or Firm*—Wolf, Greenfield & Sacks, P.C

[57] ABSTRACT

A coprocessor including a first multiplication circuit and a second multiplication circuit with a series input to receive n bits and a series output to give n+k bits. The coprocesser also includes addition and multiplexing circuits enabling the data elements produced by the multiplication circuits to be added up with one another and with other data elements encoded on n bits. The invention makes parallel use of the multiplication circuits to carry out modular or non-modular operations on pieces of binary data having n bits or more.

13 Claims, 3 Drawing Sheets

FIG. 3 ical computing which is why ~~>

MODULAR ARITHMETIC COPROCESSOR COMPRISING TWO MULTIPLICATION CIRCUITS WORKING IN PARALLEL

BACKGROUND OF THE INVENTION

1. Field of the Invention

The invention relates to a modular arithmetic coprocessor comprising two multiplication circuits working in parallel. More specifically, the invention relates to the improvement of a known arithmetic coprocessor enabling the performance of modular operations according to the Montgomery method in order to extend the applications of this coprocessor. The Montgomery method performs modular computations in a finite field denoted $GF(2^n)$ without the performance of divisions.

2. Description of the Prior Art

Conventionally, modular operations on $GF(2^n)$ are used in cryptography for applications such as authentication of messages, identification of a user and exchange of keys. Such exemplary applications are described for example in French patent application published under No. 2 679 054.

There are commercially available integrated circuits dedicated to such applications. These include, for example the device manufactured by SGS-THOMSON MICROELECTRONICS S.A. as model number ST16CF54, built around an association of the type including a central processing unit and an arithmetic coprocessor and dedicated to performing modular computations. The coprocessor used enables processing of the modular operations by the use of the Montgomery method. It is the object of European patent application No. 0 601 907 A2, hereinafter called the document D2 which in incorporated herein by reference. This coprocessor is illustrated in FIG. 1 (this figure corresponds to FIG. 2 of the document D2).

The basic operation (called a $P_{field}$ operation) implemented by this processor consists of producing, on the basis of three pieces of binary data A (multiplicand), B (multiplier) and N (modulo) encoded on an integer of n bits, of a piece of binary data denoted $P_{field}(A, B)_N$ encoded on n bits, such that $P_{field}(A, B)_N = A * B * I \bmod N$. I is a piece of binary data called an error and encoded on n bits such that $I = 2^{-n} \bmod N$ (more specifically, the value of I depends on the number of k-bit blocks, with k as an integer, considered for the encoding of A). To carry out the operation $A * B * I \bmod N$, it is assumed that the pieces of data are encoded on m words of k bits (m and k being integers), with $m * k = n$. The words of the pieces of data A and B are given to a multiplication circuit 19 having a series input to receive B, a parallel input to receive the k-bit blocks of A, and a series output.

In the coprocessor described in the document D2, k=32 and m=8 or 16. This device may be used to produce the result of the modular multiplication $A * B \bmod N$. The modular multiplication can be broken down into two successive Pfield elementary operations. $P_{field}(P_{field}(A,B)_N, H)_N$, is computed with H as a piece of data encoded on n bits, called an error correction parameter, and equal to $2^{2n} \bmod N$. For further details on the implementation of the modular multiplication, reference may be made to the document D2. Several possibilities of computation are already known. They consist in using either a software method or a specialized circuit such as the one illustrated in the document D2.

Figure 1:
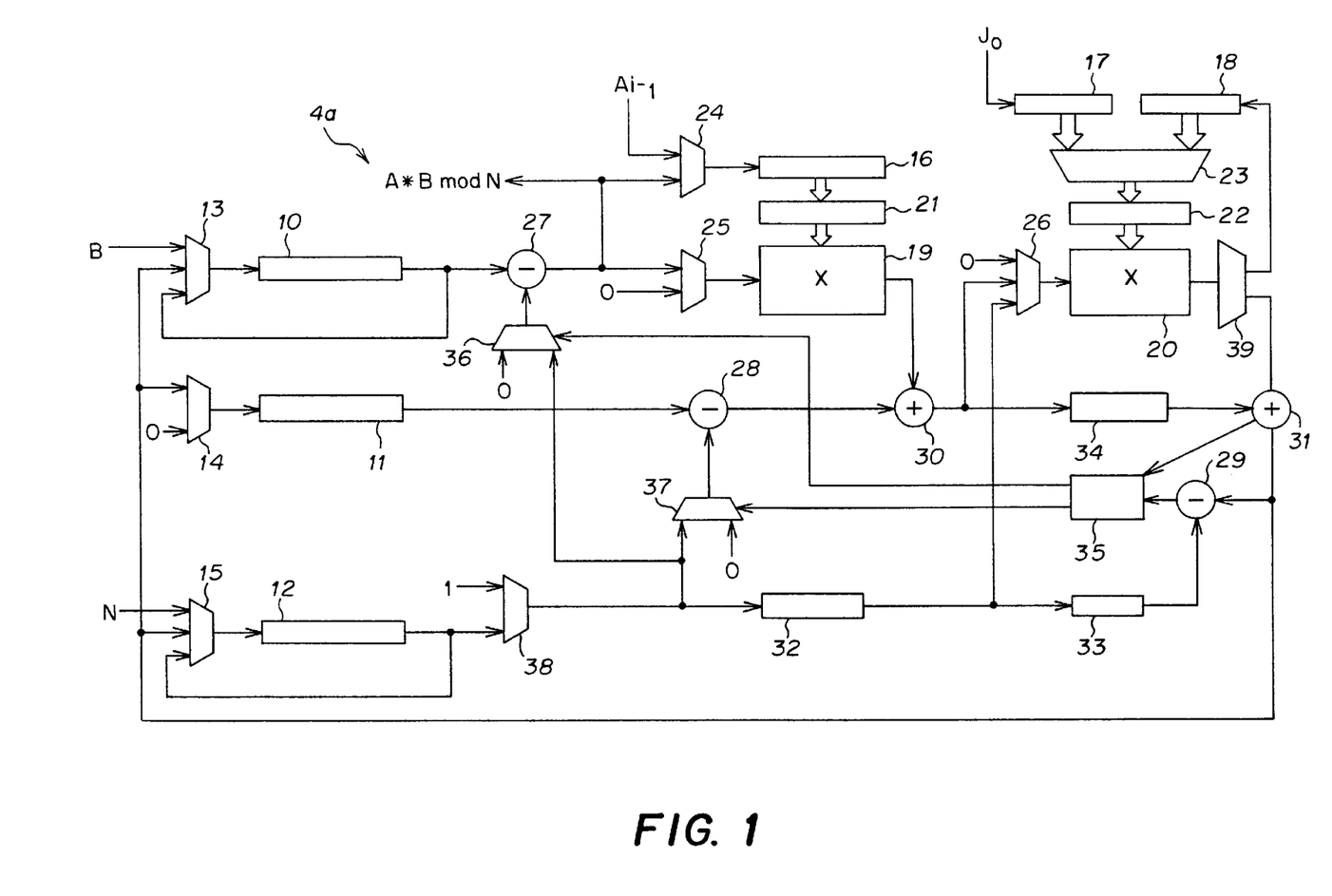
FIG. 1 shows a coprocessor 4a according to the prior art.

The coprocessor 4a illustrated in FIG. 1 comprises:
three shift registers 10, 11 and 12 with series input and output, these registers having a number n of cells, with n=m * k.

multiplexers 13, 14 and 15 placed respectively before the registers 10, 11 and 12.

three registers 16, 17 and 18 with series input and parallel output, and comprising k cells;

two multiplication circuits 19 and 20, comprising one series input, one parallel input and one series output;

two registers 21 and 22 with k cells;

multiplexers 24, 25, 26, 36, 37 and 38;

a demultiplexer 39;

series subtraction circuits 27, 28 and 29;

series addition circuits 30 and 31;

delay cells 32, 33 and 34 to delay the propagation of pieces of binary data by k cycle periods;

a comparison circuit 35.

For further details on the arrangement of the different elements of the circuit with respect to one another, reference may be made to the document D2 and especially to FIGS. 2 and 3, and to the extracts from the description pertaining thereto: page 15, line 54 to page 16, line 13, and page 17, line 50 to page 18, line 55.

Figure 2:
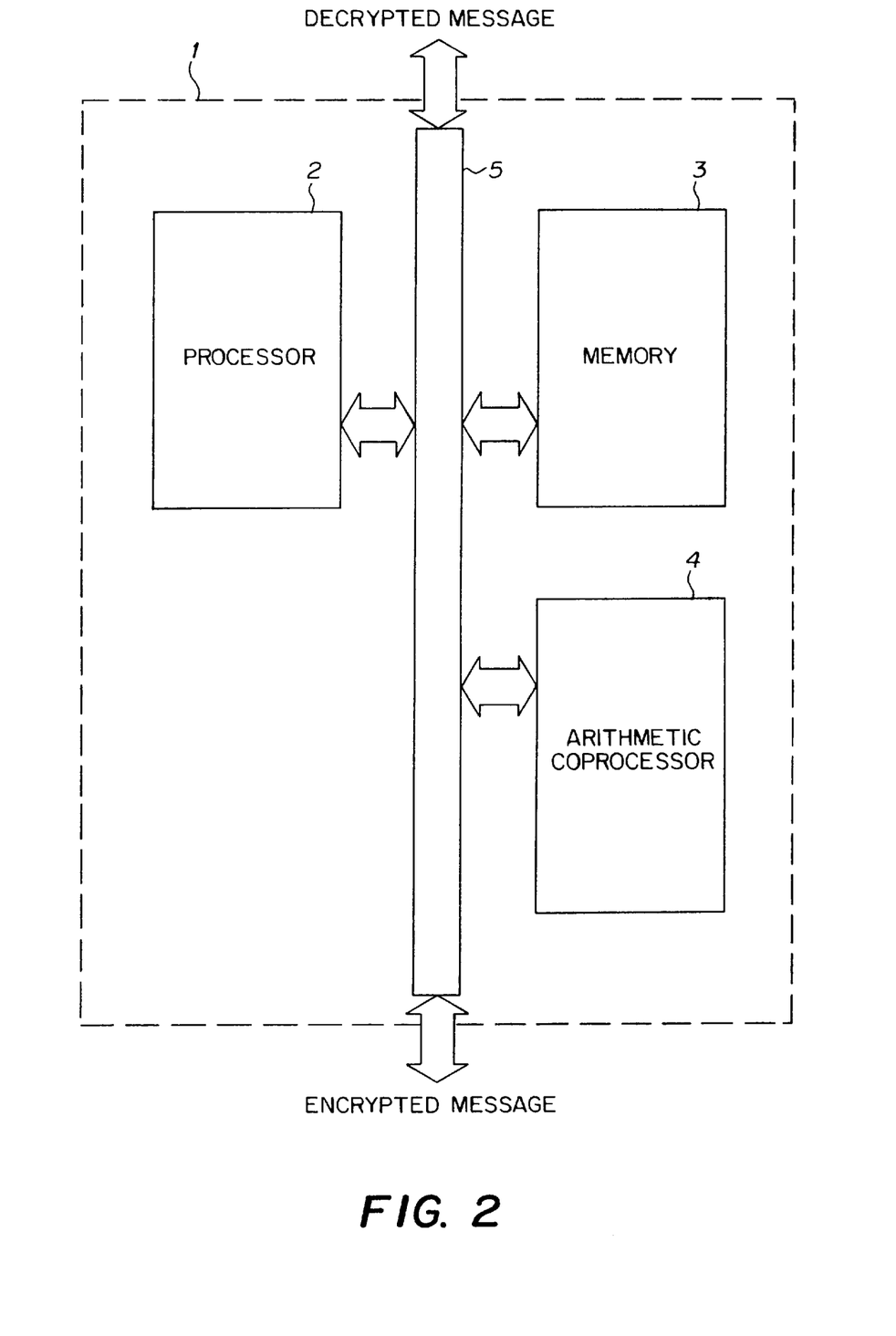
FIG. 2 shows an example of a structure of a circuit comprising a coprocessor.

The use of the coprocessor 4a illustrated in FIG. 2 to carry out a $P_{field}(A,B)_N$ operation where A, B, and N are encoded on n bits in m words of k bits, N is an odd number and A is subdivided into m words $A_{i-1}$ (with i as an integer index varying from 1 to m), includes the following steps:

1—The initialization of the circuit the software computation of a parameter $J_0$ defined by the relationship $[(N * J_0)+1] \bmod 2^k = 0$ and the serial loading of the parameter $J_0$ into the register 17, the serial loading of B into the register 10, the serial loading of N into the register 12, the serial loading of $A_0$ into the register 16 and the serial loading of n consecutive logic zeros into the register 11, the initialization of the two multiplication circuits 19 and 20, the three subtraction circuits 27, 28 and 29, and the two addition circuits 30 and 31.

2—The setting up of a loop indexed by i with i varying from 1 to m the parallel loading into the register 21 of the contents of the register 16, the performance of the different elementary operations in order to perform the following computations:

$X(i) = S(i-1) + B * A_{i-1}$ $Y_0(i) = [X(i) * J_0] \bmod 2^k$ $Z(i) = X(i) + (N * Y_0(i))$ $S(i) = Z/2^k$, / being the integer division, the subtraction, during the following iteration, of N or 0 from S depending on whether S is greater than N or not.

3—The output of the result S(k) by means of an output terminal

For further details on the running of a method of this kind, reference may be made to the document D2 and more particularly to the following extracts: page 4—line 41 to page 6—line 17 and page 19—lines 7 to 49.

Up till now, the use of the device shown in FIG. 1 could be used to optimize processing operations (in terms of computation time, memory size, etc.) for modular operations using a fixed data size, in this case 256 or 512 bits (depending on whether m is equal to 8 or 16). Now, cryptography requires increasingly efficient machines working at ever-higher speeds and using ever-more complex keys. The trend is thus towards the handling of pieces of data encoded on 768 or even 1024 bits. To process pieces of data of this kind, it is possible to envisage the use of larger-sized circuits by adapting the elements of the circuit to the sizes of the pieces of data. This approach may raise problems in applications such as smart card applications for which the size of the circuits is physically limited because of the differences in flexibility between the cards and the silicon substrates. Furthermore, there is a demand for the integration of increasing numbers of different functional elements on a card of this kind, and the place available for an encryption circuit is accordingly further reduced. It is therefore necessary to find solutions with which to limit the increase in the size of this circuit while at the same time enabling optimum operation for pieces of data whose size is greater than the size of the originally planned registers. This problem is not limited to modular arithmetic coprocessors that process pieces of data with a fixed size of 256 or 512 bits. It can also be transposed more generally to data-handling coprocessors that need to be used for operations on data whose size exceeds their processing capacity.

If it is desired to carry out modular operations using operands with a size greater than what is managed by the coprocessor (namely in practice greater than the size of the registers), it is possible to use a standard processor (with 8, 16 or 32 bits), a memory and the coprocessor of FIG. 1, the coprocessor being used to perform standard (that is to say non-modular) operations of multiplication.

It is possible, with the processor described in D2, to carry out standard operations of multiplication A * B on sizes of up to n bits by means of the following procedure.

1—Initialization the loading of k logic zeros into the register 17, the loading of B into the register 10, the loading of n logic zeros into the registers 11 and 12, the loading of the word $A_0$ of k bits of A into the register 16, the initialization of the multiplication circuit 19, the initialization of the addition and subtraction circuits 28, 30 and 31.

2—The setting up of a computation loop with i as an index varying from 1 to m the loading of the contents of the register 16 into the register 21, the performance, by a simultaneous rightward shift of the registers 10 and 11, of the multiplication of $A_{i-1}$ by B and of the addition of the contents of the register 11 with the result of the product, the storage of the k least significant bits into the register 12 by a k-bit rightward shift, and the storage of the n most significant bits of the result in the register 11, the loading of the word $A_i$ into the register 16 (preferably during the running of one or more of the preceding steps).

At the end of a procedure such as this, there is therefore the least significant bit of the result in the register 12 and the most significant bit of the result in the register 11. All that needs to be done is to add an output terminal connected to the output of the registers 11 and 12 to be able to recover the result at output of the coprocessor.

It is possible to perform the multiplication of a piece of data B encoded on n bits by means of a piece of data A encoded on m' words with m' as an integer greater than m. For this purpose, the loop is done with i varying from 1 to m'. At every m iterations, the contents of the register 12 are output by an output terminal.

Since the coprocessor can be used to carry out standard operations of multiplication, it is possible to perform modular operations on operands encoded on a number m' * k bits with m'>m. For this purpose, the operands A, B and N are manipulated by being divided into q (q as an integer) sub-operands of n bits: A[q-1], A[q-2] . . . A[0], B[q-1], B[q-2] . . . B[0], N[q-1], N[q-2] . . . N[0]. The coprocessor is used to perform standard operations of multiplication on the sub-operands.

The following method is used:

1.1—The multiplication of B by the first sub-operand of the piece of data A

1—A[0] * B[0] is computed. The result has the form $R[1]_0 R[0]_0$ with $R[1]_0$ and $R[0]_0$ being pieces of binary data encoded on n bits. $R[1]_0$ and $R[0]_0$ are output from the registers 11 and 12 and they are stored in a memory.

2—A[0] * B[1] is computed. The result has the form $R[1]_1 R[0]_1$ with $R[1]_1$ and $R[0]_1$ being pieces of binary data encoded on n bits. R[1]1 and R[0]1 are output from the registers 11 and 12 and they are stored in a memory.

Q—A[0] * B[q-1] is computed. The result has the form $R[1]_{q-1} R[0]_{q-1}$ with $R[1]_{q-1}$ and $R[0]_{q-1}$ being pieces of binary data encoded on n bits. $R[1]_{q-1}$ and $R[0]_{q-1}$ are output from the registers 11 and 12 and they are stored in a memory.

1.2—Computation of the result of the multiplication of B by the first sub-operand of A computation of $R[1]_0+R[0]_1$ and storage of the result referenced X[1], computation of $c_1+R[1]_1+R[0]_2$ ($c_1$ being the carry value of the previous calculation) and storage of the result referenced X[2], computation of $c_{q-2}+R[1]_{q-2}+R[0]_{q-1}$ and storage of the result referenced X[q-1], computation of $c_{q-1}+R[1]_{q-1}$ and storage of the result referenced X[q].

If it is assumed that $R[0]_0=X[0]$, then the result of the multiplication is the piece of data X[q] X[q-1] . . . X[1] X[0].

It is of course possible to perform the addition operations as and when the results are output. This makes it possible to minimize the size of the memory in which the results are stored.

1.3—Computation of the result of a multiplication

X[0] * J[0]=Y, with Y having the form Y[1] Y[0], Y[1] and Y[0] being encoded on n words, output and storage of Y[0].

1.4—Computation of the result of the multiplication of the first sub-operand of Y by the piece of data N 1—Y[0] * N[0] is computed. The result has the form $T[1]_0 T[0]_0$ with $T[1]_0$ and $T[0]_0$ being binary pieces of data encoded on n bits. $T[1]_0$ and $T[0]_0$ are output from the registers 11 and 12 and they are stored in a memory.

2—Y[0] * N[1] is computed. The result has the form $T[1]_1 T[0]_1$ with $T[1]_1$ and $T[0]_1$ encoded on n bits. $T[1]_1$ and $T[0]_1$ are output from the registers 11 and 12 and they are stored in a memory.

Q—Y[0] * N[q-1] is computed. The result has the form $T[1]_{q-1} T[0]_{q-1}$ with $T[1]_{q-1}$ and $T[0]_{q-1}$ being pieces of binary data encoded on m words of k bits. $T[1]_{q-1}$ and $T[0]_{q-1}$ are output from the registers 11 and 12 and they are stored in a memory.

1.5—Computation of the result of the multiplication of N by the first sub-operand of the piece of data Y computation of $T[1]_0+T[0]_1$ and storage of the result referenced U[1], computation of $c_1+T[1]_1+T[0]_2$ ($c_1$ being the carry value of the previous computation) and storage of the result referenced U[2], computation of $c_{q-2}+T[1]_{q-2}+T[0]_{q-1}$ and storage of the result referenced U[q-1], computation of $c_{q-1}+T[1]_{q-1}$ and storage of the result referenced U[q].

If it is assumed that $T[0]_0=U[0]$, then the result of the multiplication is the piece of data U[q] U[q-1] . . . U[1] U[0].

It is of course possible to perform the addition operations as and when the results are output. This makes it possible to minimize the size of the memory in which the results are stored.

1.6—Computation of the result of the modular multiplication of B by the first sub-operand of the piece of data A Computation of U+X and storage of the result, referenced Z.

The result Z of the addition has the form (c) Z[q] Z[q-1] . . . Z[1] Z[0].

storage of $S(1)=Z/2^k-(N$ or 0).

2—Resumption of the steps 1.1 to 1.6 in considering the second sub-operand of the piece of data A and in modifying the step 1.2 as here below computation of $R[1]_0+R[0]$, and storage of the result referenced W[1], computation of $c_1+R[1]_1+R[0]_2$ ($c_1$ being the carry value of the previous calculation) and storage of the result referenced W[2], computation of $c_{q-2}+R[1]_{q-2}+R[0]_{q-1}$ and storage of the result referenced W[q-1], computation of $c_{q-1}+R[1]_{q-1}$ and storage of the result referenced W[q].

Then:

computation of W+S(1) which then gives the result of the multiplication X with X having the form X[q] X[q-1] . . . X[1] X[0] and W=W[q] W[q-1] . . . W[1] W[0] with $W[0]=R[0]_0$.

Q—Resumption of the above step 2 in taking into consideration the qth sub-operand of A.

The final result of the computation is S(q)–(N or 0).

As can be seen, the method requires a certain number of exchanges of data with the exterior. These exchanges entail penalties in terms of computation time and memory space to store the results extracted from the coprocessor. Generally, the value of the coprocessors is that they use a faster clock frequency than that of the other elements that are connected to them. Hence, the value of using a coprocessor is minimized if the processing operations for which it is designed involve exchanges with circuits (standard processors, memories, etc.) that work more slowly, namely circuits to whose speeds they have to adapt during the exchanges.

The inventor has sought to modify the coprocessor illustrated in FIG. 1 so as to improve the processing of the above operations, and more particularly so as to reduce the processing time. To do this, the inventor proposes to modify the existing device so that it makes parallel use of the multiplication circuits 19 and 20, making it possible to perform operations, both modular and non-modular, at higher speed. The device according to the invention makes it possible to implement new methods of computation which are faster than the methods that can be implemented by the device of FIG. 1.

SUMMARY OF THE INVENTION

Thus, the invention relates to a device comprising:

a first register, a second register, a third register, a fourth register and a fifth register, at least one input terminal to receive binary pieces of data to be stored in these registers, a first multiplication circuit that performs a multiplication operation between two pieces of data stored in the first and third registers, a second multiplication circuit that performs a multiplication operation between two pieces of data stored in the first and fourth registers, a first addition circuit that performs operations of addition between a piece of data stored in the second register and a piece of data produced by the first multiplication circuit, a second addition circuit that performs an operation of addition between a piece of data produced by the first addition circuit and a piece of data given to the second addition circuit by the second multiplication circuit, a delay cell to delay the supply to the second addition circuit of the piece of data given by the second multiplication circuit, multiplexing means that selectively supplies, to inputs of the first addition circuit, the contents of the second register or a permanent logic state, the connection of an input of the second multiplication circuit to an output of the first register, the connection of the output of the first multiplication circuit to one of the registers and the supply to the second addition circuit of a piece of data produced by the first addition circuit or a permanent logic state.

According to one embodiment, the multiplexing means include a first multiplexer comprising two series inputs and one series output, a first input of said multiplexer being connected to an output of the second register, a second input of the multiplexer receiving a permanent logic state and the output of the multiplexer being connected to an input of the first addition circuit.

According to one embodiment, the device further comprises a subtraction circuit, placed between the second register and the first addition circuit, that performs a subtraction operation between a piece of data stored in the second register and a piece of data stored in the fifth register, the first multiplexer comprises a third series input, said multiplexer being placed between the subtraction circuit and the first addition circuit and the third input of said multiplexer being connected to an output of the subtraction circuit.

According to one embodiment, the device furthermore comprises a third addition circuit, series-connected with the first addition circuit, that performs addition operations between pieces of data stored in the second and fifth registers and a piece of data produced by the first multiplication circuit and multiplexing means that selectively supplies, to an input of the third addition circuit, the contents of the fifth register or a permanent logic state.

According to one embodiment, the multiplexing means comprise a second multiplexer having a first input, this first input enabling the connection of the output of the first or third addition circuit to one of the registers to store all or a part of the pieces of data produced by addition between the pieces of data stored in the second and fifth registers and a piece of data produced by the first multiplication circuit.

According to one embodiment, the second multiplexer comprises a second input connected to the output of the second addition circuit for the storage, in one or more of the registers, of the data produced by this second multiplication circuit.

According to one embodiment, the third and fourth registers being used to provide pieces of data to the first and second multiplication circuits, the device comprises means to connect the output of either one of the second or fifth registers to inputs of these third and fourth registers.

According to one embodiment, the device comprises a sixth register with series input and series output and multiplexing means to connect the output of this sixth register to inputs of the third and fourth registers.

According to one embodiment, the device comprises a multiplexer to selectively connect the input of the third register to the output of the sixth register or to an input terminal.

According to one embodiment, the device comprises a multiplexer having two inputs and one output, a first input of the multiplexer being connected to an input terminal to receive pieces of data from outside the device, a second input of the multiplexer being connected to the output of the sixth register for reintroducing, into said register, the pieces of data given at its output.

According to one embodiment, the device further comprises a delay cell, placed between an output of the first addition circuit and an input of the second addition circuit, comprising multiplexing means to directly connect said first and second addition circuits, thus preventing the introduction of a delay between said circuits.

The invention also relates to a device comprising a processor, a memory, a communications bus and a device as defined here above.

The invention also relates to a method for the implementation of a non-modular multiplication A * B, A and B being pieces of binary data encoded in n bits, n being an integer, these pieces of data being subdivided into m words of k bits $A = A_{m-1} \ldots A_0$ and $B = B_{m-1} \ldots B_0$, m being an even number, the method comprising the following steps:

1—Initialization:
loading the pieces of data A and B into first and second n-bit registers with series input and output, and loading the words $A_0$ and $A_1$ into third and fourth k-bit registers with series input and parallel output, initializing first and second addition circuits and of first and second multiplication circuits, selecting a first input of a first multiplexer so that it permanently supplies logic zeros to a first series input of the first addition circuit, selecting an input of a second multiplexer so that the pieces of data produced by the second multiplication circuit are given with a delay of k clock strokes to a series input of the second addition circuit, selecting inputs of a third and fourth multiplexers so as to connect an output of the first register to series inputs of the first and second multiplication circuits.

2—Implementation of a computation loop with i as an index varying from 1 to m/2

2.1—Iteration 1:
loading the contents of the third and fourth registers into fifth and sixth k-bit registers with parallel input and output, these outputs being connected to parallel inputs of the first and second multiplication circuits, performing, by simultaneous rightward shifting of the contents of the first register and of a seventh n-bit register with series input and output, multiplication operations of the words $A_1$ and $A_0$ by the piece of data B, the pieces of data produced by the first and second multiplication circuits being encoded on n+k bits, adding, in the first addition circuit, the bits produced by the first multiplication circuit with the bits given by the first multiplexer, storing the k first bits produced by the first multiplication circuit in an eighth n-bit register with series input and output, adding, in the second addition circuit, the n+k bits produced by the second multiplication circuit with the n most significant bits produced by the first multiplication circuit, these bits being complemented by k zeros, storing, in the eighth register, of the k first bits produced by the second addition circuit and the storage, in the seventh register, of the following n bits, during the above operations, transferring the words $A_3$ and $A_2$ into the third and fourth registers, selecting a second input of the first multiplexer in order to connect the output of the seventh register to the first input of the first addition circuit.

2.j—iteration j, j varying from 2 to m/2–1:
loading the contents of the third and fourth registers into the fifth and sixth registers, performing, by simultaneous rightward shifting of the contents of the first and seventh registers, multiplication operations of the words $A_{2j-1}$ and $A_{2j-2}$ by the piece of data B, adding, in the first addition circuit, the bits produced by the first multiplication circuit with the contents of the seventh register, storing the k first bits produced by the first addition circuit in the eighth register, adding, in the second addition circuit, of the n+k bits produced by the second multiplication circuit with the n most significant bits produced by the first addition circuit complemented by k zeros to obtain an identical size for the pieces of data that are added up, storing, in the eighth register, of the k first bits produced by the second addition circuit and the storage, in the seventh register, of the n following bits, during the above operations, the transfer of the words $A_{2j+1}$ and $A_{2j}$ into the third and fourth registers.

2.m/2—iteration m/2
Resuming the step 2.j, apart from the transfer of words from the second register into the third and fourth registers, the n least significant bits of the result being in the eighth register and the n most significant bits of the result being in the seventh register at the end of this iteration.

BRIEF DESCRIPTION OF THE DRAWINGS

The invention will be understood more clearly and other particular features and advantages shall appear from the following description, made with reference to the appended drawings, of which.

DETAILED DESCRIPTION

FIG. 2 shows an encryption circuit 1 comprising a processor 2 (for example an 8-bit, 16-bit or 32-bit processor), a memory 3, a coprocessor 4 and a communications bus 5. The bus 5 is used to connect the elements 2, 3 and 4 together and/or to the exterior of the circuit 1 in order to exchange pieces of data and/or control signals. The memory is used to store pieces of binary data having different formats. The processor 2 is used to manage the information exchanges between the memory 3, the coprocessor 4 and the exterior. The coprocessor is a modified version of the coprocessor 4a shown in FIG. 1, as illustrated in FIG. 3.

Figure 3:
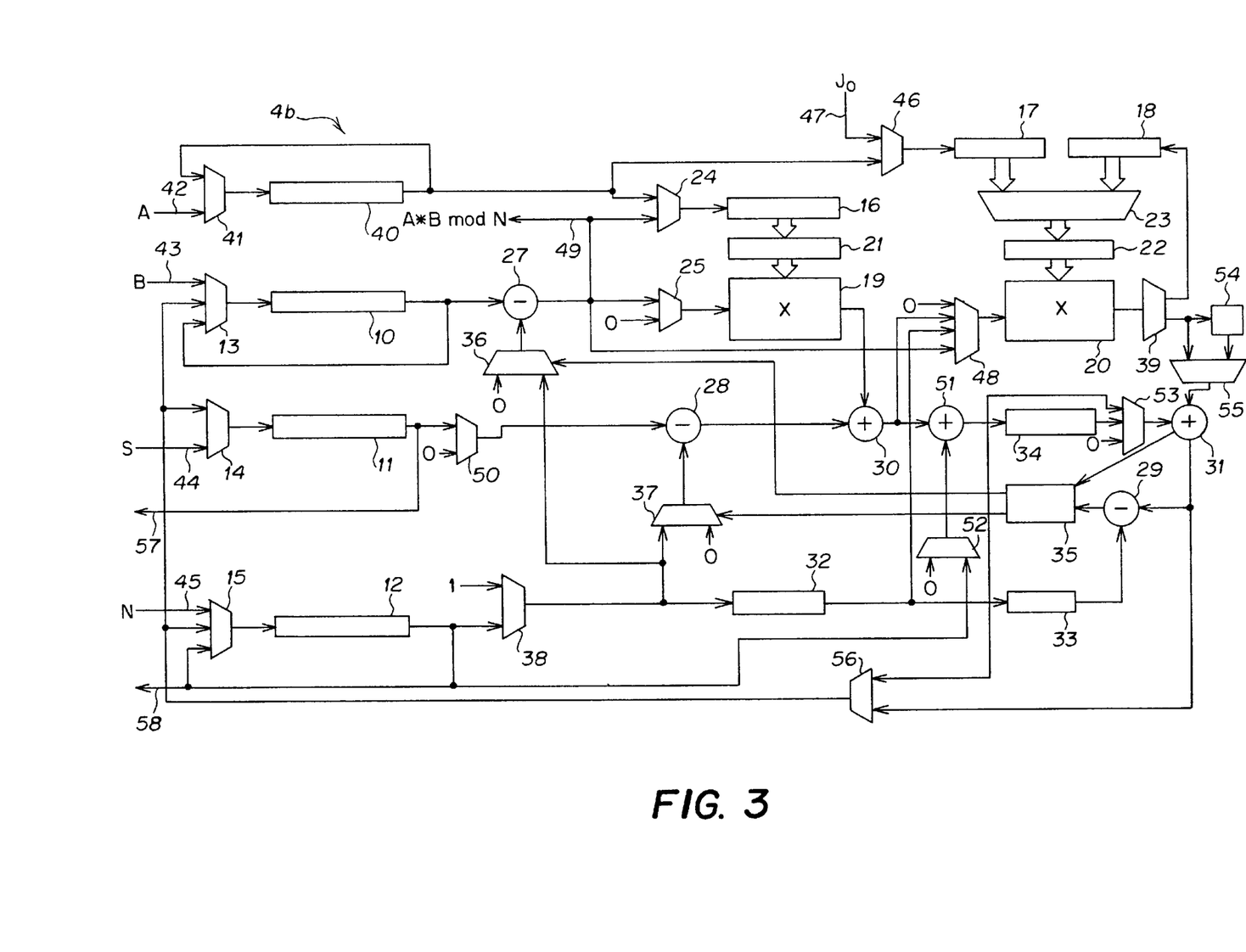
FIG. 3 shows an exemplary embodiment of a coprocessor 4b according to the invention.

FIG. 3 shows an exemplary coprocessor 4b according to the invention.

The circuit shown in FIG. 3 comprises:

four shift registers 10, 11, 12 and 40 with series input and series output. These registers have a number n (with n as an integer) of cells, with n m * k (m and k as integers), a multiplexer 41 comprising two series inputs and one series output. The series output of the multiplexer 41 is connected to the input of the register 40. A first input of the multiplexer 41 is connected to a first input terminal 42 and a second input of the multiplexer 41 is connected to the output of the register 40.

a multiplexer 13 comprising three series inputs and one series output. The series output of the multiplexer 13 is connected to the input of the register 10. A first input of the multiplexer 13 is connected to a second input terminal 43 and a second input of the multiplexer 13 is connected to the output of the register 10.

a multiplexer 14 comprising two series inputs and one series output. The series output of the multiplexer 14 is connected to the input of the register 11 and a first input of the multiplexer 14 is connected to a third input terminal 44, a multiplexer 15 comprising three series inputs and one series output. The series output of the multiplexer 15 is connected to the input of the register 12. A first input of the multiplexer 15 is connected to a fourth input terminal 45 and a second input of the multiplexer, 15 is connected to the output of the register 12, three k-cell registers 16, 17 and 18 comprising a series input and a parallel output, a multiplexer 46 comprising two series inputs and one series output. The series output of the multiplexer 46 is connected to the input of the register 17. A first input of the multiplexer 46 is connected to a fifth input terminal 47, and a second input of the multiplexer 46 is connected to the output of the register 40.

two multiplication circuits 19 and 20 comprising a series input, a parallel input to receive k bits and a series output, two k-bit storage registers 21 and 22 comprising a parallel input and output. The input of the register 21 is connected to the output of the register 16. The output of the register 21 is connected to the parallel input of the multiplication circuit 19 and the output of the register 22 is connected to the parallel input of the multiplication circuit 20, a multiplexer 23 comprising two parallel inputs and one parallel output. The first input of the multiplexer 23 is connected to the output of the register 17 and a second input of the multiplexer 23 is connected to the output of the register 18. The output of the multiplexer 23 is connected to the input of the register 22.

two multiplexers 24 and 25, each having two series inputs and one series output. The output of the multiplexer 24 is connected to the input of the register 16. A first input of the multiplexer 24 is connected to the output of the register 40. The output of the multiplexer 25 is connected to the series input of the multiplication circuit 19. A first input of the multiplexer 25 receives a logic zero.

a multiplexer 48 comprising four series inputs and one series output. The output of the multiplexer 48 is connected to the series input of the multiplication circuit 20 and a first input of this multiplexer receives a logic zero, subtraction circuits 27, 28 and 29 each comprising two series inputs and one series output. A first input of the circuit 27 is connected to the output of the register 10. The output of the circuit 27 is connected to each of the second inputs of the multiplexers 24 and 25, to an output terminal 49 and to a fourth input of the multiplexer 48.

a multiplexer 50 comprising two series inputs and one series output. The output of the multiplexer 50 is connected to a first input of the circuit 28. A first input of the multiplexer 50 is connected to the output of the register 11 and a second input of this multiplexer receives a logic zero.

three addition circuits 30, 31 and 51 each comprising two series inputs and one series output. A first input of this circuit 30 is connected to the output of the multiplication circuit 19 and a second input of this circuit is connected to the output of the subtraction circuit 28. The output of the circuit 30 is connected firstly to a second input of the multiplexer 48 and, secondly, to a first input of the circuit 51. The output of the circuit 31 is connected to a first input of the substraction circuit 29.

a multiplexer 52 comprising two series inputs and one series output. The output of the multiplexer 52 is connected to a second input of the addition circuit 51. A first input of the multiplexer 52 is connected to the output of the register 12 and a second input of this multiplexer receives a logic zero.

a multiplexer 53 comprising three series inputs and one series output. The series output of the multiplexer 53 is connected to a first input of the addition circuit 31 and a first input of this multiplexer is connected to the output of the addition circuit 51. The third input of the multiplexer receives a logic zero.

delay cells 32, 33 and 34 for the delaying, by k cycle periods, of the propagation of pieces of binary data (these cells being typically k-bit shift registers, namely registers having the size of the registers 16, 17 and 18), these cells comprising one series input and one series output. The output of the cell 32 is connected firstly to the third input of the multiplexer 48 and secondly to the input of the cell 33. The output of the cell 33 is connected to a second input of the substraction circuit 29. The input of the cell 34 is connected to the output of the addition circuit 51 and the output of the cell 34 is connected to the second input of the multiplexer 53, a comparison circuit 35 comprising two series inputs and two outputs. A first input of the circuit 35 is connected to the output of the addition circuit 31 and a second input of the circuit 35 is connected to the output of the substraction circuit 29.

two multiplexers 36 and 37, each comprising two series inputs, one selection input and one series output. Each of the first series inputs of the multiplexers 36 and 37 receives a logic zero. Each of the selection inputs is connected to one of the outputs of the circuit 35. The output of the multiplexer 36 is connected to a second input of the substraction circuit 27 and the output of the multiplexer 37 is connected to a second input of the substraction circuit 28, a multiplexer 38 comprising two series inputs and one series output. A first input of the multiplexer 38 receives a logic "one". A second input of the multiplexer 38 is connected to the output of the register 12. The output of the multiplexer 38 is connected, firstly, to the input of the cell 32 and, secondly, to second inputs of the multiplexers 36 and 37, a demultiplexer 39 comprising a series input and two series outputs. The input of the demultiplexer 39 is connected to the output of the circuit 20 and a first output of the demultiplexer 39 is connected to the input of the register 18, a delay cell 54 for the delaying, by k cycle periods, the propagation of pieces of binary data (these cells being typically k-bit shift registers), this cell comprising one series input and one series output. The input of the cell 54 is connected to a second output of the demultiplexer 39.

a multiplexer 55 comprising two series inputs and one series output. A first input of the multiplexer 55 is connected to the second output of the demultiplexer 39. A second input of the multiplexer 55 is connected to the output of the cell 54 and the output of the multiplexer 55 is connected to a second input of the addition circuit 31, a multiplexer 56 comprising two series inputs and one series output. A first input of the multiplexer 56 is connected to the output of the addition circuit 51, namely to the output of the second of the two series-connected addition circuits 30 and 51. A second input of the multiplexer 56 is connected to the output of the addition circuit 31. The output of this multiplexer is connected to third inputs of the multiplexers 13 and 15 and to a second input of the multiplexer 14, two output terminals 57 and 58 respectively connected to the outputs of the registers 11 and 12.

As shall be seen further below, this exemplary coprocessor, made according to the invention could undergo modifications without departing from the framework of the invention.

With regard to the output and input terminals, it could be chosen to use distinct terminals but these could also be one or more input/output terminals common to several elements of the coprocessor. One advantage in using distinct terminals is that it is possible to receive and/or give pieces of data from and/or to elements external to the coprocessor (such as the processor 2 for example) in parallel, thus reducing the period of the exchanges between the circuit and the external elements.

Furthermore, with regard to the elements of the circuit 4b, the above description must also be understood as being a description that is functional rather than structural. In other words, it is important to be able to make the connections as indicated between elements fulfilling the functions listed (multiplexing, addition, subtraction, etc.). In particular, the multiplexers could be combined with one another and then have a greater number of inputs, outputs and selection inputs. With regard to the multiplexers 25, 36, 37, 38, 50, 52 and 53 which have an input receiving a fixed signal (a logic zero or logic one), it is possible to incorporate them functionally into the circuits 19, 27, 28, 30 and 51 if these circuits include a control input enabling a logic state to be imposed on one of their inputs.

As compared with the device of FIG. 1, the device of FIG. 3 includes the same elements, some added elements and modifications in the connections of the elements with one another. In particular, the device of FIG. 3 has a supplementary register 40, a supplementary addition circuit 51, a supplementary delay cell 54 and multiplexers 41, 46, 50, 52, 53, 55 and 56. The multiplexer 14 has its first input connected to an input terminal 44. Finally, the multiplexer 48 has a supplementary input so that the pieces of data stored in the register 10 can be given at the series input of the multiplication circuit 20.

The register 40 enables the storage in the coprocessor of an n-bit operand A, enabling the exchanges between the coprocessor and the exterior to be limited and therefore providing for a gain in time. The multiplexer 46 enables the loading of the register 17 with bits given by the register 40. This enables the parallel use of the multiplication circuits 19 and 20 without requiring successive operations for the loading of the registers 16 and 17 with words given to the coprocessor.

It is possible, if necessary, to do without the register 40 and the multiplexer 46 and carry out the parallel loading from the exterior of the k-bit words in order to implement parallel operation of the multiplication circuits 19 and 20. It is also possible, as shall be seen hereinafter, to use one of the registers 11 or 12 to store the pieces of data to be given to the registers 16 and 17. In this case, the output of this register 11 or 12 is connected to the first and second inputs of the multiplexers 24 and 46.

The multiplexer 41 makes it possible, by looping the output of the register 40 to its input, to keep the contents of this register permanently intact when words are given, by shifting, at the output of this register. Thus, if the working of the coprocessor is interrupted, it is possible to resume the course of operations at an already performed step without having to reload the register from the exterior of the coprocessor. Care will be taken simply to carry out the shifts that are necessary in the register to return to the state corresponding to the step to be performed (if the words contained in the register 40 are always identical, their organization develops as a function of the shifts made).

The multiplexer 50 enables the setting at zero of the second input of the addition circuit 30 independently of the contents of the register 11. This makes it possible to make the addition circuit 30 transparent to the flow of bits produced at the output of the multiplication circuit 19. Indeed, in this case, the bits at the output of the addition circuit 30 are identical to those received at the first input of this circuit.

It will be noted that the multiplexer 50 can be placed directly between the output of the subtraction circuit 28 and the first input of the addition circuit 30. The multiplexer used then will be a three-input multiplexer having a first input connected to the output of the register 11, a second input connected to the output of the subtraction circuit 28 and a third input receiving a logic zero. By thus getting rid of the subtraction circuit 28, it is possible to reduce the total power consumption of the coprocessor 4b by planning to cut off the circuit 28 and if necessary other circuits (such as the multiplexer 37) that are functionally attached to it when the circuit 28 is not used. Another approach includes using a two-input multiplexer 50 as shown in FIG. 3 and in selecting the first input of the multiplexer 37 so that the subtraction circuit 28 does not modify the bits given to the addition circuit 30 by the register 11.

The fourth input of the multiplexer 48 could be connected directly to the output of the register 10 (which is equivalent, from a functional point of view, to connecting it to the output of the subtraction circuit 27 if the latter receives a logic zero constantly at its second input).

The addition circuit 51 enables the implementation of operations of the type A * B+C+D, the pieces of data C and D being given by the registers 1 1 and 12.

The multiplexer 52 makes it possible firstly to give the contents of the register 12 to the addition circuit 51 to implement said operation or secondly to permanently give it a logic zero. This latter feature makes it possible to make the addition circuit 51 transparent to the bits produced by the multiplication circuit 19 and addition circuit 30. This makes it possible firstly to carry out the operation A * B+C in a simple way (there is then no need to load the register 12 with n logic zeros) and, secondly, to carry out, without excessive complication, the usual operations for which the device of FIG. 1 is planned (it is necessary only to provide for an additional selection control signal for the multiplexer 52).

It will be noted that it would be possible to place the addition circuit 51 between the output of the multiplication circuit 19 and the first input of the addition circuit 30 and connect the first input of the multiplexer 56 to the output of the addition circuit 30.

It would also be possible to place the addition circuit 51 between the output of the register 11 and the second input of the addition circuit 30. Just as here above, the first input of the multiplexer 56 is then connected to the output of the addition circuit 30.

It is also possible to place the addition circuit 51 between the output of the multiplexer 53 and the first input of the addition circuit 31.

It is again possible to place the addition circuit 51 downline from the addition circuit 3 1. This makes the management of the A * B+C+D type operations more complicated inasmuch as it may then become necessary, downline from the addition circuit 31, to add pieces of data whose significance is lower than that of the pieces of data given at output of the addition circuit 31. It is then necessary to provide for a means to set up a delay, downline from the addition circuit 31, of the pieces of data produced by this circuit 31 or, upline, for the providing of pieces of data to this circuit 31. It will be noted that this positioning of the addition circuit 51 downline from the addition circuit 31 is not an encumbrance as regards the performance of simple multiplication on pieces of n-bit data since, in this case, the circuit 51 is not used (as shall be seen further below).

As shall be seen further below, the addition circuit 51 is used to carry out operations on pieces of data with a size greater than n, these operations requiring handling operations of the A * B+C+D type. It is possible to do without these operations if it is desired simply to obtain a gain in time with regard to operations relating to pieces of data whose size is smaller than or equal to n, the invention relating above all to the simultaneous use of the two multiplication circuits 19 and 20.

The multiplexer 53 enables the output of the addition circuit 51 to be connected directly to the first input of the addition circuit 31 without delaying the transfer of data between these circuits through the delay cell 34. It also makes it possible to provide logic zeros to the addition circuit 31. This makes it possible, as shall be seen further below, if necessary to complement the pieces of n-bit data given by the addition circuits 30 and 51 to the addition circuit 31 with k logic zeros so that the size of these pieces of data corresponds to (n+k) bits of the pieces of data produced by the multiplication circuit 20.

It is possible if necessary to use a two-input multiplexer and not circumvent the delay cell 34 but this will be done to the detriment of the computation time owing to the systematic crossing of this delay cell 34. It is also possible functionally, during the operations, to replace the third input of the multiplexer 53 by a selection of the first inputs of the multiplexers 25 and 37 and the second inputs of the multiplexers 50 and 52 so that the first input of the multiplexer 53 then receives logic zeros.

The delay cell 54 enables the flow of the bits produced by the multiplication circuit 20 to be delayed by k cycle periods.

It is thus possible to add up the bits produced by the multiplication circuits 19 and 20 without taking account of the k first bits given by the multiplication circuit 19 during an operation. The multiplexer 55 enables said operation to be implemented while at the same time enabling the use of the improved coprocessor of FIG. 3 to carry out the operations implemented by the coprocessor of FIG. 1 (it is enough, for this purpose, to connect the second output of the demultiplexer 39 directly to the second input of the addition circuit 31).

If the delay cell 34 is not short-circuited by means of the multiplexer 53, the cell 54 will be modified so as to obtain a delay of 2*k cycle periods.

The multiplexer 56 enables the storage, in one of the registers 10 to 12, of the bits produced by the addition circuits 30 (if the second input of the addition circuit 51 receives a logic zero, in which case the circuit 51 is transparent to the bits produced by the circuit 30) or 5 1.

It is also possible to directly store the bits produced by the multiplication circuit 19 by selecting the multiplexers 50, 37 and 52 so that they give a logic zero at their output. On this assumption, the pieces of data received at the first input of the multiplexer coincide with the pieces of data produced at output of the multiplication circuit 19.

It is possible, by means of the invention, to carry out a non-modular multiplication without taking account of the elements of the device 4a used in the context of a Pfield operation. It is therefore possible, in such a case, to consider limiting the power consumption of the circuit 4 by inhibiting the working of the elements that are used solely in the context of a Pfield operation but are not used in the computation methods described here below.

Furthermore, the invention enables operations to be performed by the parallel use of the two multiplication circuits 19 and 20. The computation time is halved by the parallel processing of two k-bit words of the multiplicand A as shall be described here below. With the device shown in FIG. 3, when two words of the multiplicand are given simultaneously to the multiplication circuits 19 and 20, the least significant word is given to the circuit 19 and the most significant word is given to the circuit 20.

1. Non-modular multiplication on pieces of data with a size smaller than or equal to n bits Let us assume that it is sought to carry out a standard multiplication A * B, the pieces of binary data A and B being encoded on n bits. We shall consider the subdivision of the pieces of data A and B into m words of k bits. Let $A=A_{m-1} \ldots A_0$ and $B=B_{m-1} \ldots B_0$.

It is assumed that m is a multiple of two. If this is not so, registers of (m+1) * k bits will be used. It is also possible to control the multiplexer 48 so as to give logic zeros at the series input of the multiplication circuit 20 when the mth word of k bits of the piece of data A is given at the parallel input of the multiplication circuit 19 (the multiplication circuit 20 then produces n+k logic zeros).

Similarly, the pieces of data A and B could have a size smaller than n. If necessary, the most significant bits of these pieces of data will be complemented by zeros to obtain pieces of data of a size equal to n bits, if it is desired to have only one control program for the processor. It is also possible to provide for a sequencing of the conmmands of the device comprising a variable number of computation loops, enabling the processing time to be reduced if the pieces of data are encoded on a number of bits smaller than n. It is also possible to use operands of different sizes, by complementing the smaller-sized operand with logic zeros or by adapting the control program of the coprocessor.

The following procedure is used:

1—Initialization:

the loading in the registers 10 and 40 of the pieces of data B and A, and loading of $A_0$ and $A_1$ in the registers 16 and 17, respectively, the initialization of the addition circuits 30, 31 and 51 and of the multiplication circuits 19 and 20 (and possibly of the subtraction circuits if they enter the data processing paths; in this case the multiplexers 36 and 37 will be selected so that their output permanently gives a logic zero, which is equivalent to making the subtraction circuits 27 and 28 transparent to the flow of bits received at their first inputs), the selection of the second inputs of the multiplexers 50 and 52 so that they permanently give logic zeros at the second inputs of the addition circuits 30 and 51, the selection of the second input of the multiplexer 55 so that the pieces of data produced by the multiplication circuit 20 are given with a delay of k clock strokes to the addition circuit 31, the selection of the second and fourth inputs of the multiplexers 25 and 48, respectively.

2—Implementation of a computation loop with i as an index varying from 1 to m/2

2.1—Iteration 1:

the loading of the contents of the registers 16 and 17 into the registers 21 and 22, the performance, by simultaneous rightward shifting of the contents of the registers 10 and 11, of the operation of multiplication of $A_1$ and $A_0$ by B. The pieces of data produced by the multiplication circuits 19 and 20 are encoded on n+k bits, the addition, in the addition circuit 30, of the bits produced by the multiplication circuit 19 with the bits given by the multiplexer 50 (in other words with a piece of data equal to zero) and addition with a piece of data equal to zero in the addition circuit 51, the storage of the k first bits produced by the multiplication circuit 19 in the register 12, the first input of the multiplexer 56 being selected, the addition, in the addition circuit 31, of the n+k bits produced by the multiplication circuit 20 with the n most significant bits produced by the multiplication circuit 19, these bits being complemented by k zeros, and the selection of the second input of the multiplexer 56, the storage in the register 12 of the k first bits produced by the addition circuit 31 and the storage in the register 11 of the n following bits, during the above operations, the transfer of the words $A_3$ and $A_2$ into the registers 16 and 17, the selection of the first input of the multiplexer 50 so as to connect the output of the register 11 to the second input of the addition circuit 30.

2.j—iteration j, j varying from 2 to m/2−1:

the loading of the contents of the registers 16 and 17 into the registers 21 and 22, the performance, by simultaneous rightward shifting of the registers 10 and 11, of the operations for the multiplication of $A_{2j-1}$ and $A_{2j-2}$ by B; the pieces of data produced by the multiplication circuits 19 and 20 are encoded on n+k bits, the addition, in the addition circuit 30, of the bits produced by the multiplication circuit 19 with the contents of the register 11, the storage of the k first bits produced by the addition circuit 30 in the register 12, the second input of the multiplexer 56 being selected and the addition circuit 51 being transparent to the bits given by the addition circuit 30, the addition, in the addition circuit 31, of the n+k bits produced by the multiplication circuit 20 with the n most significant bits produced by the addition circuit 30 (complemented by k zeros to ensure an identical size of the added data) and the selection of the first input of the multiplexer 56, the storage in the register 12 of the k first bits produced by the addition circuit 31 and the storage in the register 11 of the n following bits, during the above operations, the transfer of the words $A_{2j+1}$ and $A_{2j}$ into the registers 16 and 17.

2.m/2—iteration m/2

The resumption of the step 2.j, apart from the transfer of words from the register 40 into the registers 16 and 16 (this transfer is unnecessary).

At the end of this iteration, the n least significant bits of the result are in the register 12 and the n most significant bits are in the register 11.

The gain in time to perform the operation is equal to 50% with respect to the device shown in FIG. 1 (taking account of the computation steps proper, the initialization step having an identical duration for the devices of FIGS. 1 and 3).

It will be noted that the addition circuit 51 is not used in the implementation of the method. It is therefore possible however in a first stage to improve the prior art device by implementing the device of FIG. 3, except for the addition circuit 51 and the multiplexer 52. It is also possible, as mentioned already here above, to place the addition circuit 51 between the output of the multiplication circuit 19 and the first input of the addition circuit 30. It will then be appropriate to connect the first input of the multiplexer 56 to the output of the circuit 30 if it is desired to carry out operations of the A * B+C+D type as illustrated here below.

It is also possible, without modifying the device of FIG. 3, to exchange the roles of the addition circuit 51 and 30 on the one hand and of the registers 11 and 12 on the other hand.

It is also possible, as the case may be, to place the addition circuit 51 between the output of the register 11 and the addition circuit 30. This introduces no difference in the running of the method described here above but it will be appropriate then to connect the first input of the multiplexer 56 to the output of the addition circuit 30.

Furthermore, if it is desired simply to improve the prior art device in the performance of multiplication on pieces of data with a size n, it will also be possible to eliminate the register 40 and use the register 12 to store the piece of data A. The illustrated circuit will then be modified by connecting the output of the register 12 to the first and second inputs of the multiplexers 24 and 46. Indeed, at each iteration, two k-bit words are given to the registers 16 and 17 and two k-bit words are stored in the register 12. It is therefore possible to limit the operation to using the register 12, the words of the piece of data A being gradually replaced by the least significant words of the final result of the operation.

It will be noted that, in the parallel performance of multiplication operations as described, the multiplication circuit 19 placed upline with respect to the multiplication circuit 20 produces the least significant bits.

It is possible if necessary to operate in reverse. In this case, the data elements produced by the multiplication circuit 19 are delayed in the cell 34 (which then functionally replaces the cell 54) and the k first and k last logic zeros are respectively given to the first and second inputs of the addition circuit 31 to obtain a correspondence between the place values of the pieces of data received by this addition circuit 31. Since the multiplexer 56 has no reason to exist, it can be removed.

A problem arises for the addition of the contents of the register 11 to the pieces of data produced by the multiplication circuits 19 and 20. One approach is to delay the pieces of data produced by the multiplication circuit 19 between the output of this circuit and the first input of the addition circuit 30. In this case, it is necessary to short-circuit the cell 34 (or else to use the cell 54 to delay the pieces of data at output of the multiplication circuit 20) so that the bits having identical place values are added up at the appropriate time in the addition circuit 31. Another approach is to position the addition circuit 51 downline with respect to the addition circuit 31 and to provide the pieces of data of the register 11 to the circuit 51 by means of appropriate multiplexing means. In this case, the addition circuit 51 replaces the addition circuit 30 for the addition of pieces of data produced by the multiplication circuits and the contents of the register 11. It is then necessary to add this addition circuit 51 to the known circuit whereas, in the example described in detail, this circuit 51 is not used and may be eliminated if it is not desired to process pieces of data of a size greater than n. We shall not go into detail into the reversal of the role of the multiplication circuit. The implementing of this reversal entails no difficulty to those skilled in the art, given the indications given here above and the description of the device illustrated with reference to FIG. 3.

Finally it will be noted that, to make the cell 54, it is possible, inasmuch as the cell 34 has not been used elsewhere, to use this cell 34. In this case, it is enough firstly to have available a multiplexer at input of the cell 34 (to enable the connection of this input to the second output of the demultiplexer 39 or to the output of one of the addition circuits 30 or 51 depending on their arrangement) and secondly to have available a demultiplexer at output of the cell 34 (to enable this output to be connected to the second input of the multiplexer 55 or to the second input of the multiplexer 53).

2. Multiplication on pieces of data with a size greater than n

Let it be assumed that it is sought to make a standard multiplication A * B=C, the binary pieces of data A and B being encoded on a size greater than n. As an example, we shall assume pieces of data encoded on 2 * n bits, the result C being encoded on 4 * n bits. A, B and C have the form A[1] A[0], B[1] B[0] and C[3] C[2] C[1] C[0], the operands A[1] to C[0] being encoded on n bits.

As above, the method described shall be extended without difficulty to operands of different sizes.

By using the device of FIG. 1, the following procedure is used:

1—the loading of the piece of data B[0] into the register 10.
2—the computation of A[0] * B[0]=R[1] C[0], R[1] and C[0] being encoded in n bits and stored outside the coprocessor at the end of the computation.
3—the computation of A[1] * B[0]=R'[1] R'[0], R'[1] and R'[0] being encoded in n bits and stored outside the coprocessor at the end of the computation.
4—the loading of the piece of data B[1] in the register 10.
5—the computation of A[0] * B[1]=R"[1] R"[0], R"[1] and R"[0] being encoded in n bits and stored outside the coprocessor at the end of the computation.
6—the computation of A[1] * B[1]=R'"[1] R'"[0], R'"[1] and R'"[0] being encoded in n bits and stored outside the coprocessor at the end of the computation.

The subsequent steps are performed outside the coprocessor, for example by means of a processor or a dedicated wired circuit.

7—the computation of R'[1] R'[0]+R[1]=T[1] T[0], T[1] and T[0] being encoded in n bits.
8–the computation of T[1] T[0]+R"[1] R"[0]=T'[1] C[1], T'[1] and C[1] being encoded in n bits.
9—the computation of R'"[1] R'"[0]+T'[1]=C[3] C[2], C[3] C[2] being encoded in n bits.

By using the device of FIG. 3, the same operation can be done as follows:

1—the loading of the pieces of data A[0] and B[0] in the registers 40 and 10.
2—the computation of A[0] * B[0]+0+0=R[1] C[0] (according to the method described here above) and output of the pieces of data C[0] from the register 12, the piece of data R[1] being stored in the register 11.
3—the loading of the piece of data A[1] in the register 40 (this can be done during the shifting of A[0] to the registers 16 and 17).
4—the computation of A[1]=B[0] * R[1]+0=R'[1] R'[0], the selection of the multiplexer 50 having been modified so as to connect the output of the register 11 to the second input of the addition circuit 30 during the first iteration of the loop, and the output of the piece of data R'[1] from the register 11, the piece of data R'[0] being stored in the register 12.
5—the loading of the pieces of data A[0] and B[1] in the registers 40 and 10 (these may be done during the last iteration of the computation of the step 4).
6—the computation of A[0] * B[1]+0+R'[0]=R"[1] C[1], the selection of the multiplexer 52 having been modified so as to connect the output of the register 12 to the second input of the addition circuit 51 during the first iteration of the loop, and the output of the piece of data C[1] from the register 12, the piece of data R"[1] being stored in the register 11.
7—the loading of the pieces of data A[1] and R'[1] in the registers 40 and 12.
8—the computation of A[1] * B[1]+R"[1]+R'[1]=C[3] C[2].

The gain in computation time is 50% for the steps 2, 3, 5 and 6 of the prior art to which it is necessary to add the absence of the steps corresponding to external additions of 2 * n bits. Furthermore, with the device of FIG. 1, it is necessary to take account of the routine outputs of data towards the exterior of the coprocessor, once the multiplication operations have been done (which is detrimental from the viewpoint of time and the viewpoint of memory space needed for storage).

With the device according to the invention, the only piece of data that is output, apart from the sub-operands of the result, is the intermediate result R'[1]. It is possible, if necessary, to output R'[1] directly at the output of the multiplexer 56 by connecting this output to an output terminal. This enables this transfer to be done during the computation of the step 4.

The method described is given by way of an example. It is possible to implement other methods while continuing to benefit from the advantages obtained through the simultaneous use of two multiplication circuits 19 and 20.

Thus, it is possible for example to use the method of Karatsuba described here below:

1—the comparison firstly of the n bits of A[0] and A[1] and secondly of the n bits of B[0] and B[1] (it will be assumed that A[1] and B[1] encoded on n bits are greater than A[0] and B[0]).

2—the computation of A[0] * B [0] in the coprocessor and the output of the result referenced C[0] and encoded on 2 * n bits.

3—the computation of A[1] * B[1] in the coprocessor and the output of the result referenced C[1] encoded on 2 * n bits.

4—the computation of (B[1]–B[0]) and (A[1]–A[0]) on n bits.

5—the computation of (B[1]–B[0]) * (A[1]–A[0]) in the coprocessor and the output of the result C[3] encoded on 2 * n bits.

6—the computation of 2 * C[0]+2 * C[1]+C[3].

Only three operations of multiplication are done instead of four (the multiplication by two is obtained directly in binary logic by the shifting of the pieces of data) and the operation can be faster (depending on the difference of the clock frequencies used by the coprocessor and the processor). This, however, calls for exchanges between the coprocessor and the exterior, and memory space to store the intermediate results. It will be noted that the additions could possibly be obtained by using the resources of the coprocessor (registers and addition circuits).

For the implementation of the multiplication of pieces of data of a size greater than 2 * n, the method requires exchanges between the coprocessor and the exterior since it is then necessary to be able to add at least three pieces of data of the same place value. The fact nevertheless is that the coprocessor according to the invention remains advantageous in the implementation of multiplication operations. Furthermore, if we assume that n=512, the possibility of performing computations on 1024 bits appears to date to be generally sufficient given the goals of security in civilian applications of encryption.

3. Modular operations on pieces of data with a size of n: example 1

The coprocessor illustrated in FIG. 3 makes it possible to perform modular operations on operands encoded on a number m' * k bits with m' greater than or equal to m more quickly than is the case with the device of FIG. 1.

For this purpose, the operands A, B and N are manipulated by being divided into q (q as an integer) sub-operands of n bits: A[q–1] A[q–2] . . . A[0], B[q–1] B[q–2] . . . B[0], N[q–1] N[q–2] . . . N[0]. It will be noted that A and B could in practice have different sizes. It is assumed here, for the sake of simplicity, that A and B have the same size. It will also be assumed that the piece of data A comprises an even number of sub-operands (if this is not so, it may be complemented by bits of higher place value that are set at zero so as to obtain an even number). The step-by-step operation of the elements of the coprocessor shall not be described in detail as it does not raise any problem to those skilled in the art who know the document D2.

It will be noted that in the above method the addition circuit 51 is not used.

The operation A * B+C is therefore performed with the utmost efficiency by means of the resources of the coprocessors.

The following is the method:

1.1—The multiplication of B by the first sub-operand of A

1—A[0] * B[0]+0 is computed. The result has the form $R[1]_0$ $R[0]_0$ with $R[1]_0$ and $R[0]_0$ being pieces of binary data encoded on n bits. $R[0]0=X[0]$ is output from the register 12 and it is stored in a memory (for example the memory 3 of the circuit 1)

2—A[0] * B[1]+$R[1]_0$ is computed. The result has the form $R[1]_1$ $R[0]_1$ with $R[1]_1$ and $R[0]_1$ being pieces of binary data encoded on n bits. $R[0]_1=X[1]$ is output from the register 12 and it is stored in a memory.

Q—A[0] * B[q–1]+$R[1]_{q-2}$ is computed. The result has the form $R[1]_{q-1}$ $R[0]_{q-1}$ with $R[1]_{q-1}$ and $R[0]_{q-1}$ being pieces of binary data encoded on n bits. $R[1]_{q-1}=X[q]$ and $R[0]_{q-1}=X[q-1]$ are output from the registers 11 and 12 and they are stored in a memory.

The result of the multiplication is the piece of data X[q] X[q–1] . . . X[1] X[0].

1.2—The computation of the result of a multiplication X[0] * J[0]=Y with Y having the form Y[1] Y[0], Y being a piece of binary data encoded on 2*n bits, output and storage of Y[0].

1.3—The computation of the result of the multiplication of the first sub-operand of Y by the piece of data N 1—Y[0] * N[0]+X[0] is computed. The result has the form $T[1]_0$ $T[0]_0$ with $T[1]_0$ and $T[0]_0$ being pieces of binary data encoded on n bits. $T[0]_0=U[0]$ is output from the register 12 and it is stored in a memory.

2—Y[0] * N[1]+$T[1]_0$ is computed. The result has the form $T[1]_1$ $T[0]_1$ with $T[1]_1$ and $T[0]_1$ being pieces of binary data encoded on n bits. $T[0]_1=U[1]$ is output from the register 12 and it is stored in a memory.

Q—Y[0] * N[q–1]+$T[1]_{q-2}$ is computed. The result has the form $T[1]_{q-1}$ $T[0]q-1$ with $T[1]_{q-1}$ and $T[0]_{q-1}$ being pieces of binary data encoded on n bits. $T[1]_{q-1}=U[q]$ and $T[1]_{q-1}=U[q-1]$ are output from the registers 11 and 12 and are stored in a memory.

The result of the multiplication is the piece of data U[q] U[q–1] . . . U[1] U[0].

1.4—The computation of the result of the modular multiplication of B by the first sub-operand of A U+X is computed and the result referenced Z is stored.

The result Z of the addition has the form (c) Z[q] Z[q–1] . . . Z[1] Z[0].

$S(1)=Z/2^k-(N$ or $0)$ is stored.

2—Resumption of the steps 1.1 to 1.4 in considering the second sub-operand of A by modifying the step 1.1 as here below 1—A[0] * B[0] is computed. The result has the form $R[1]_0$ $R[0]_0$ with $R[1]_0$ and $R[0]_0$ being pieces of binary data encoded on n bits. $R[0]_0=W[0]$ is output from the register 12 and it is stored in a memory (for example the memory 3 of the circuit 1)

2—A[1] * B[1]+$R[1]_0$ is computed. The result has the form $R[1]_1$ $R[0]_1$ with $R[1]_1$ and $R[0]_1$ being pieces of binary data encoded on n bits. $R[0]_1=W[1]$ is output from the register 12 and it is stored in a memory.

Q—A[1] * B[q–1]+$R[1]_{q-2}$ is computed. The result has the form $R[1]_{q-1}$ $R[0]_{q-1}$ with $R[1]_{q-1}$ and $R[0]_{q-1}$ being pieces of binary data encoded on n bits. $R[1]_{q-1}=W[q]$ and $R[0]_{q-1}=W[q-1]$ are output from the registers 11 and 12 and they are stored in a memory.

W+S(1) is computed, giving the result of the multiplication X with X having the form X[q] X[q–1] . . . X[1] X[0].

Q—Resumption of the above step 2 in taking into consideration the $q^{th}$ sub-operand of A The final result of the computation is S(q)–(N or 0).

Gain in computation time

The computation time is measured in terms of number of clock cycles of the coprocessor.

The multiplication of the contents of the register 10 by the contents of the registers 16 and 17 requires (n+2·k) cycles (in not taking account of the loading of the registers and the initializing of the device). It is furthermore assumed that the additions are performed by means of a series adder for which the rate of the operation is set by the clock of the coprocessor. One addition then requires n cycles.

Method According to the Prior Art

Computation of the values $A_i * B$: $q \cdot [q \cdot m \, (n+2 \cdot k)] = n \cdot q^2 \cdot (m+2)$ Computation of the values W: $q \cdot q \cdot n = n \cdot q^2$ Computation of the values X: $(q-1) \cdot (q+1) \cdot n = n \cdot (q^2-1)$ Computation of the values Y: $q \cdot m \cdot (n+2 \cdot k) = n \cdot q \cdot (m+2)$ Computation of the values T: $q \cdot [q \cdot m \cdot (n+2 \cdot k)] = n \cdot q^2 \cdot (m+2)$ Computation of the values U: $q \cdot q \cdot n = n \cdot q^2$ Computation of the values Z: $q \cdot (q+1) \cdot n = n \cdot (q^2+q)$ The number of cycles needed to perform the computations is given by the following formula:

$$2 \cdot n \cdot (m+4) \cdot q^2 + n \cdot (m+3) \cdot q - n.$$

Method Using the Invention

Computation of the values $A * B+R$: $q \cdot [q \cdot m/2 \cdot (n+k)] = n/2 \cdot (m+1) \cdot q^2$ Computation of the values X: $(q-1) \cdot (q+1) \cdot n = n \cdot q^2 - n$ Computation of the values Y: $q \cdot m/2 \cdot (n+k) = n/2 \cdot (m+1) \cdot q$ Computation of the values T: $q \cdot [q \cdot m/2 \cdot (n+k)] = n/2 \cdot (m+1) \cdot q^2$ Computation of the values Z: $q \cdot (q+1) \cdot n = n \cdot q^2 + n \cdot q$ The number of cycles needed to perform the computations is given by the following formula:

$$n/2 \cdot (2m+4) \cdot q^2 + n/2 \cdot (m+3) \cdot q - n.$$

Let it be assumed that q=3 and k=32.

For m=8 (n=256), the first method requires 63,488 cycles and the second method requires 27,136 cycles, giving a gain of 57.26%.

For m=16 (n=512), the first method requires 212,992 cycles and the second method requires 97,024 cycles, giving a gain of 54.45%.

It will be observed that these computations do not take account of the exchanges of data between the coprocessor and the exterior, these exchanges being far more numerous in the implementation of the first method. The time needed to perform these exchanges depends on the clock frequency used to set the rate of operation of the external elements (such as the processor 2, the memory 3 and the communications bus 5 of the circuit 1), this frequency being in practice generally lower than the clock frequency of the coprocessor.

The capacity of the coprocessor according to the invention to implement operations of the $A * B+C$ type also has other advantages, for example in the implementation of the RSA encryption method.

RSA Method

The RSA encryption method makes it necessary to perform computations of the $C=M^D \mod N$ type with M as a message to be encrypted or decrypted, N as a modulo value such that $N=P * Q$, with P and Q being prime integers and D such that $D *E=\mod ((P-1)* (Q-1))$, with E as a known quantity.

An algorithm to perform this computation is the following:

$A=(M \mod p)^{D \, mod(P-1)} \mod P$ $B=(M \mod Q)^{D \, mod(Q-1)} \mod Q$ $U=Q^{-1} \mod P$ If $A<B \mod P$ then $C=(((A+P-(B \mod P)) * U) \mod P) * Q+B$ Else $C=(((A-(B \mod P)) * U) \mod P) * Q+B$ The invention enables the computation of C which has the form $X * Q+B$ by loading B into the register 11. It will be noted in this respect that it is particularly useful to provide for a multiplexer 14 having one input connected to an input terminal of the circuit. Indeed, in the method explained here above dealing with multiplication for pieces of data whose size is greater than that of the registers, the contents of the register 11 are produced within the circuit. An input terminal is therefore not used in this case to load the contents of the register 11. If it is desired to compute $A * B+C$, with C having any unspecified value, it should be possible to enter the piece of data C into the register 11 by connecting one input of the multiplexer to an input terminal.

4. Modular operations on pieces of data with a size greater than n: example 2.

In this example, the addition circuit 51 is used.

The operation $A*B+C+D$ is performed.

It is considered, in the same way as earlier, that the operands A, B and N take the form of q n-bit sub-operands: A[q–1] A[q–2] ... A[0], B[q–1] B[q–2] ... B[0], N[q–1] N[q–2] ... N[0].

The following is the method:

1.1—The multiplication of B by the first sub-operand of A

1—A[0] * B[0]+0+0 is computed. The result has the form $R[1]_0$ $R[0]_0$ with $R[1]_0$ and $R[0]_0$ being pieces of binary data encoded on n bits. $R[0]_0=X[0]$ is output from the register 12 and it is stored in a memory (for example the memory 3 of the circuit 1)

2—A[0] * B[1]+$R[1]_0$+0 is computed. The result has the form $R[1]_1$ $R[0]_1$ with $R[1]_1$ and $R[0]_1$ being pieces of binary data encoded on n bits. $R[0]_1=X[1]$ is output from the register 12 and it is stored in a memory.

Q—A[0] * B[q–1]+$R[1]_{q-2}$+0 is computed. The result has the form $R[1]_{q-1}$ $R[0]_{q-1}$ with $R[1]_{q-1}$ and $R[0]_{q-1}$ being pieces of binary data encoded on n bits. $R[1]_{q-1}=X[q]$ and $R[0]_{q-1}=X[q-1]$ are output from the registers 1 1 and 12 and stored in a memory.

The result of the multiplication is the piece of data X[q] X[q–1] ... X[1] X[0].

1.2—The computation of the result of an operation of multiplication

X[0] * J[0]=Y is computed with Y having the form Y[1] Y[0], Y being a piece of data encoded on 2*n bits, output and storage of Y[0].

1.3—The computation of the result of the multiplication of the first sub-operand of Y by the piece of data N 1—Y[0] * N[0]+X[0]+0 is computed. The result has the form $T[1]_0$ $T[0]_0$ with $T[1]_0$ and $T[0]_0$ being pieces of binary data encoded on n bits. $T[0]_0=Z[0]$ is output from the register 12 and it is stored in a memory.

2—Y[0] * N[1]+X[1]+$T[1]_0$ is computed. The result has the form $T[1]_1$ $T[0]_1$ with $T[1]_1$ and $T[0]_1$ being pieces of binary data encoded on n bits. $T[0]_1=Z[1]$ is output from the register 12 and it is stored in a memory.

Q—Y[0] * N[q–1]+X[q–1]+$T[1]_{q-2}$ is computed. The result has the form $T[1]_{q-1}$ $T[0]_{q-1}$ with $T[1]_{q-1}$ and $T[0]_{q-1}$ being pieces of binary data encoded on n bits. $T[1]_{q-1}$ and $T[0]_{q-1}=Z[q-1]$ is output from the registers 11 and 12 and stored in a memory.

$X[q]+T[1]_{q-1}=Z[q]$ is computed.

The result Z of the multiplication is the piece of data $Z[q]$ $Z[q-1] \ldots Z[1] Z[0]$.

Storage of $S1=Z/2^k-(N \text{ or } 0)=S1[q] S1[q-1] \ldots S1[1] S1[0]$.

2—Resumption of the steps 1.1 to 1.3 in considering the second sub-operand of A by modifying the step 1.1 as here below 1—$A[1] * B[0]+S1[0]+0$ is computed. The result has the form $R[1]_0 R[0]_0$ with $R[1]_0$ and $R[0]_0$ being pieces of binary data encoded on n bits. $R[0]_0=X[0]$ is output from the register 12 and it is stored in a memory (for example the memory 3 of the circuit 1)

2—$A[1] * B[1]+S1[1]+R[1]_0$ is computed. The result has the form $R[1]_1 R[0]_1$ with $R[1]_1$ and $R[0]_1$ being pieces of binary data encoded on n bits. $R[0]_1=X[1]$ is output from the register 12 and it is stored in a memory.

Q—$A[1] * B[q-1]+S1[q-1]+R1_{q-2}$ is computed. The result has the form $R[1]_{q-1} R[0]_{q-1}$ with $R[1]_{q-1}$ and $R[0]_{q-1}$ being pieces of binary data encoded on n bits. $R[1]_{q-1}$ and $R[0]_{q-1}=X[q-1]$ is output from the registers 1 1 and 12 and stored in a memory.

$X[q]=R[1]_{q-1}+S1[q]$ is computed, giving the result of the multiplication X with X having the form $X[q] X[q-1] \ldots X[1] X[0]$.

Q—Resumption of the above steps in taking into consideration the $q^{th}$ sub-operand of A The final result of the computation is $S(q)-(N \text{ or } 0)$.

Gain in computation time

The computation time is measured in terms of number of clock cycles of the coprocessor.

The multiplication of the contents of the register 10 by the contents of the registers 16 and 17 calls for (n+2·k) cycles (in not taking account of the loading of the registers and the initialization of the circuit). Furthermore, the additions shall be considered to have been performed by means of a serial adder whose rate of operation is set by the clock of the coprocessor. An addition then requires n cycles.

Computation of the values $A * B+R+S$: $[q \cdot m/2 \cdot (n+k)]=n/2 \cdot q^2 \cdot (m+1)$ Computation of the values $X_i$: $(q-1) \cdot n = n \cdot q - n$ Computation of the values Y: $q \cdot m/2 \cdot (n+k)=n/2 \cdot q \cdot (m+1)$ Computation of the values $Y * N+T+X$: $q \cdot [q \cdot m/2 \cdot (n+k)]=n/2 \cdot Q^2 \cdot (m+1)$ Computation of the values $Z_q$: $q \cdot n = n \cdot q$ The number of cycles needed to perform the computations is given by the following formula:

$$n \cdot (m+1) \cdot q^2 + n/2 \cdot (m+5) \cdot q - n.$$

Let it be assumed that q=3 and k=32.

For m=8 (n=256), the method requires 25,472 giving a gain of 59.88%.

For m=16 (n=512), the method requires 90,880 cycles, giving a gain of 57,33%.

It will be observed that these computations do not take account of the exchanges of data between the coprocessor and the exterior, these exchanges being far more numerous in the implementation of the first method. The time needed to perform these exchanges depends on the clock frequency used to set the rate of operation of the external elements (such as the processor 2, the memory 3 and the communications bus 5 of the circuit 1), this frequency being in practice generally lower than the clock frequency of the coprocessor.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device comprising:
   a first register, a second register, a third register, a fourth register and a fifth register,
   at least one input terminal to receive binary pieces of data to be stored in these registers,
   a first multiplication circuit that performs a multiplication operation between two pieces of data stored in the first and third registers,
   a second multiplication circuit that performs a multiplication operation between two pieces of data stored in the first and fourth registers,
   a first addition circuit that performs operations of addition between a piece of data stored in the second register and a piece of data produced by the first multiplication circuit,
   a second addition circuit that performs an operation of addition between a piece of data produced by the first addition circuit and a piece of data given to the second addition circuit by the second multiplication circuit,
   a delay cell to delay the supply to the second addition circuit of the piece of data given by the second multiplication circuit,
   multiplexing means that selectively supplies, to inputs of the first addition circuit, the contents of the second register or a permanent logic state, the connection of an input of the second multiplication circuit to an output of the first register, the connection of the output of the first multiplication circuit to one of the registers and the supply to the second addition circuit of a piece of data produced by the first addition circuit or a permanent logic state.

2. A device according to claim 1, wherein the multiplexing means comprise a first multiplexer with two series inputs and one series output, a first input of said multiplexer being connected to an output of the second register, a second input of the multiplexer receiving a permanent logic state and the output of the multiplexer being connected to an input of the first addition circuit.

3. A device according to claim 2, further comprising a subtraction circuit, placed between the second register and the first addition circuit, that performs a subtraction operation between a piece of data stored in the second register and a piece of data stored in the fifth register, wherein the first multiplexer comprises a third series input, said multiplexer being placed between the subtraction circuit and the first addition circuit and the third input of said multiplexer being connected to an output of the subtraction circuit.

4. A device according to one of the claim 1, further comprising a third addition circuit, series-connected with the first addition circuit that performs addition operations between the pieces of data stored in the second and fifth registers and a piece of data produced by the first multiplication circuit and multiplexing means that selectively supplies, to an input of the third addition circuit, of the contents of the fifth register or a permanent logic state.

5. A device according to claim 4, wherein the multiplexing means comprise a second multiplexer having a first input, this first input enabling the connection of the output of the first or third addition circuit to one of the registers to store all or a part of the pieces of data produced by addition between pieces of data stored in the second and fifth registers and a piece of data produced by the first multiplication circuit.

6. A device according to claim 5, wherein the second multiplexer comprises a second input connected to the output of the second addition circuit for the storage, in one or more of the registers, of the data produced by this second multiplication circuit.

7. A device according to claim 1, the third and fourth registers being used to provide pieces of data to the first and second multiplication circuits, wherein the device comprises means to connect the output of either one of the second or fifth registers to inputs of these third and fourth registers.

8. A device according to claim 1, comprising a sixth register with series input and series output and multiplexing means to connect the output of this sixth register to inputs of the third and fourth registers.

9. A device according to claim 8, comprising a multiplexer to selectively connect the input of the third register to the output of the sixth register or to an input terminal.

10. A device according to claim 8, comprising a multiplexer having two inputs and one output, a first input of the multiplexer being connected to an input terminal to receive pieces of data from outside the device, a second input of the multiplexer being connected to the output of the sixth register for reintroducing, into said register, of the pieces of data given at its output.

11. A device according to claim 1, further comprising a delay cell placed between an output of the first addition circuit and an input of the second addition circuit, the device comprising multiplexing means to directly connect said first and second addition circuits, thus preventing the introduction of a delay between said circuits.

12. A device comprising a processor, a memory, a communications bus and a device defined according to claim 1.

13. A method for the implementation of a non-modular multiplication A * B, A and B being pieces of binary data encoded in n bits, n being an integer, these pieces of data being subdivided into m words of k bits $A=A_{m-1} \ldots A_0$ and $B=B_{m-1} \ldots B_0$ m being an even number, the method comprising the following steps:

1—Initialization:
loading the pieces of data A and B into first and second n-bit registers with series input and output, and loading the words $A_0$ and $A_1$ into third and fourth k-bit registers with series input and parallel output,
initializing first and second addition circuits and first and second multiplication circuits,
selecting a first input of a first multiplexer so that it permanently supplies logic zeros to a first series input of the first addition circuit,
selecting an input of a second multiplexer so that the pieces of data produced by the second multiplication circuit are given with a delay of k clock strokes to a series input of the second addition circuit,
selecting inputs of a third and fourth multiplexers so as to connect an output of the first register to series inputs of the first and second multiplication circuits;

2—Implementation of a computation loop with i as an index varying from 1 to m/2

2.1—Iteration 1:
loading the contents of the third and fourth registers into fifth and sixth k-bit registers with parallel input and output, these outputs being connected to parallel inputs of the first and second multiplication circuits,
performing, by simultaneous rightward shifting of the contents of the first register and of a seventh n-bit register with series input and output, multiplication operations of the words $A_1$ and $A_0$ by the piece of data B, the pieces of data produced by the first and second multiplication circuits being encoded on n+k bits,
adding, in the first addition circuit, the bits produced by the first multiplication circuit with the bits given by the first multiplexer,
storing of the k first bits produced by the first multiplication circuit in an eighth n-bit register with series input and output,
adding, in the second addition circuit, the n+k bits produced by the second multiplication circuit with the n most significant bits produced by the first multiplication circuit, these bits being complemented by k zeros,
storaging, in the eighth register, of the k first bits produced by the second addition circuit and the storage, in the seventh register, of the following n bits,
during the above operations, transferring the words $A_3$ and $A_2$ into the third and fourth registers,
selecting of a second input of the first multiplexer in order to connect the output of the seventh register to the first input of the first addition circuit;

2.j—iteration j, j varying from 2 to m/2−1:
loading the contents of the third and fourth registers into the fifth and sixth registers,
performing, by simultaneous rightward shifting of the contents of the first and seventh registers, multiplication operations of the words $A_{2j-1}$ and $A_{2j-2}$ by the piece of data B,
adding, in the first addition circuit, the bits produced by the first multiplication circuit with the contents of the seventh register,
storing the k first bits produced by the first addition circuit in the eighth register,
adding, in the second addition circuit, the n+k bits produced by the second multiplication circuit with the n most significant bits produced by the first addition circuit complemented by k zeros to obtain an identical size for the pieces of data that are added up,
storing, in the eighth register, the k first bits produced by the second addition circuit and the storage, in the seventh register, of the n following bits,
during the above operations, the transfer of the words A2j+1 and A2j into the third and fourth registers; and 2.m/2—iteration m/2
Resuming step 2j, apart from the transfer of words from the second register into the third and fourth registers, the n least significant bits of the result being in the eighth register and the n most significant bits of the result being in the seventh register at the end of this iteration.

* * * * *

UNITED STATES PATENT AND TRADEMARK OFFICE
CERTIFICATE OF CORRECTION

PATENT NO. : 6,035,317
DATED : March 7, 2000
INVENTOR(S) : Guy Monier

It is certified that error appears in the above-identified patent and that said Letters Patent is hereby corrected as shown below:

On the title page, under United States Patent [19] the inventor's name should be Monier

On the title page, item [75] should read:

[75] Inventor:    Guy Monier, Rognac, France

Signed and Sealed this

Twenty-third Day of January, 2001

Attest:

Q. TODD DICKINSON

Attesting Officer

Commissioner of Patents and Trademarks